United States Patent Office 3,202,576
Patented Aug. 24, 1965

3,202,576
ANTICOCCIDIAL COMPOSITIONS AND
METHODS OF USING SAME
Edward F. Rogers, Middletown, and Robert L. Clark, Woodbridge, N.J., assignors to Merck & Co., Inc., Rahway, N.J., a corporation of New Jersey
No Drawing. Filed May 31, 1963, Ser. No. 284,376
16 Claims. (Cl. 167—53.1)

This invention relates to novel compositions for the treatment of poultry disease. More specifically, it relates to compositions useful in the management of the poultry disease coccidiosis. Still more specifically, it is concerned with animal feeds and feed supplements containing as active anticoccidial agents certain pyridine and alkyl pyridine sulfonamides. It is concerned also with methods of treating and preventing coccidiosis with the pyridine and alkyl pyridine sulfonamides described herein. It relates further to new anticoccidial compositions containing the hereinafter described pyridine and alkyl pyridine sulfonamides and at least one other compound having anticoccidial activity.

Coccidiosis is a common and widespread poultry disease caused by species of protozoan parasites of the genus Eimeria. The most important of these species are *E. maxima, E. acervulina, E. tenella, E. necatrix, E. brunetti, E. praecox* and *E. mitis*. In turkeys, *E. meleagridis* and *E. adenoides* are also causative organisms of coccidiosis. When left untreated, the disease leads to poor weight gain, reduced feed efficiency and high mortality. For these reasons, the control of coccidiosis is highly important to the poultry industry. Although *E. tenella* and *E. necatrix* cause the most lethal forms of the disease, it has recently been realized that infections due to other species, and particularly to the so-called intestinal species such as *E. acervulina, E. brunetti* and *E. maxima*, present a serious economic problem. It has further been found that a particular coccidiostat is frequently much more effective against some species than against others. Thus, several commercially available coccidiostats are highly effective against *E. tenella* and *E. necatrix*, and are consequently of great value, but the same compounds are less active or even inactive against strains of other species. For this reason, a considerable amount of research has been carried out in an effort to find compounds primarily effective against the intestinal species (*E. brunetti, E. acervulina, E. maxima*). Such compounds could be used alone to control these forms of coccidiosis, or they could be administered to poultry in conjunction with other compounds primarily active against *E. tenella* and/or *E. necatrix*.

According to the present invention, it has now been found that certain pyridine and alkyl pyridine sulfonamide compounds are highly effective in the treatment and prevention of intestinal coccidiosis. One object of the invention, therefore, is to provide novel compositions containing such compounds. Other objects are provision of animal feed supplements and of animal feeds containing such compounds as active anticoccidial agents, and of methods of treating coccidiosis with such compositions. An additional object is the provision of new highly potent, broad spectrum anticoccidial compositions having as active ingredients a compound of Formula I hereinbelow and at least one other coccidiostat that is highly active against the "non-intestinal" species of coccidia. Other objects will become evident from the following discussion of the invention.

In accordance with this invention, it has now been found that pyridine and methyl pyridine sulfonamide compounds represented by the structural Formula I possess a valuable degree of anticoccidial activity:

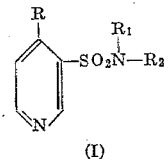

(I)

R represents hydrogen or a methyl group; $R_1$ and $R_2$ each represent hydrogen or lower alkyl radicals, and preferably radicals having up to five carbon atoms, such as methyl, ethyl, propyl or amyl. R, $R_1$ and $R_2$ may be the same or different in any given compound.

Also within our invention are non-toxic salts of such pyridine sulfonamides. These may be acid addition salts such as the mineral acid salts, e.g. hydrochloride, hydrobromide, sulfate, nitrate, phosphate, or they may be basic salts such as the alkali metal salts. As will be appreciated by those skilled in the chemical art, basic salts will not be formed when both $R_1$ and $R_2$ in Formula I are lower alkyl.

Specific examples of compounds within the purview of this invention are 3-pyridine sulfonamide, N-methyl-3-pyridine sulfonamide, 4-methyl-3-pyridine sulfonamide, monia to give the sulfonamide. 4-methyl-3-pyridine methyl-3-pyridine sulfonamide, 4-methyl-N-ethyl-3-pyridine sulfonamide, N-butyl-3-pyridine sulfonamide and N-methyl-N-ethyl-3-pyridine sulfonamide.

The chemical synthesis of 3-pyridine sulfonamide has been described in the scientific literature. It is conveniently prepared from 3-pyridine sulfonic acid by reacting said acid with phosphorus pentachloride to form 3-pyridine sulfonyl chloride, which is in turn treated with ammonia to give the sulfonamide. 4-methyl-3-pyridine sulfonamide is obtained in the same fashion from 4-methyl-3-pyridine sulfonic acid. The N-alkyl or N,N-dialkyl sulfonamides of the invention are prepared by reaction of 3-pyridine sulfonyl chloride or 4-methyl-3-pyridine sulfonyl chloride with the appropriate alkyl or dialkylamine, e.g. methylamine, ethylamine, dimethylamine, methyl-ethylamine and the like.

The compounds of Formula I above are highly effective for the treatment or prevention of coccidiosis due to the intestinal form of this disease. For this purpose, they are administered to poultry as a component of the feed or the drinking water of the birds. The amount of 3-pyridine sulfonamide compound required for optimum control of coccidiosis infections in poultry will, of course, vary somewhat with the specific compound or compounds employed, the severity of the infection and the causative organism. (Hereinafter, we will for convenience sake refer to the chemicals of Formula I generically as 3-pyridine sulfonamide compounds or 3-pyridine sulfonamides. When reference is made to 3-pyridine sulfonamide itself, this will be clear from the context.)

The coccidiostats of the present invention are effective when administered via the poultry feed a levels of from about 0.005% to about 0.05% by weight of the feedstuff, and feed levels of about 0.01%–0.03% of drug by weight of feed are preferred. Higher levels of up to 0.1% by weight of feed can, of course, be employed although such levels are generally used only for therapeutic purposes when the drug is administered for relatively short periods of time. It is desirable to employ the lowest levels that afford fully adequate control of coccidiosis in order to eliminate as far as possible any risk of side effects that might appear on prolonged feeding of the compounds.

As previously mentioned, the 3-pyridine sulfonamide compounds of Formula I may also be administered to poultry by way of the drinking water of the birds. When this route is used for prevention of coccidiosis, the treatment levels in the water are generally about one-half of those that would be used in a solid feedstuff since the birds drink about twice as much as they eat. This method of treatment is advantageously employed in the therapeutic use of the compounds since poultry infected with coccidiosis consume less solid feed than normal healthy birds. The compounds may be added directly to the drinking water or, alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of coccidiostat, and preparations containing from about 0.1–20% by weight of active compound are suitable.

According to one aspect of the invention, novel poultry feed and feed supplement compositions are provided in which one or more of our sulfonamides are present as an active anticoccidial ingredient. The poultry feed compositions are those normally used in the poultry raising industry supplemented with minor but effective quantities of a compound of Formula I above, or a salt thereof. The finished feed may, for instance, be a so-called mash containing ground grain, animal and vegetable proteins, mineral and vitamin concentrates, or it may be a broiler feed containing a large proportion of ground yellow corn together with nutritive substances such as minerals, vitamins, meat products, soybean oil meal, and fish meal. These feedstuffs are frequently supplemented with small amounts of antibiotics, and the feed compositions of our invention may, as discussed hereinbelow, also contain minor amounts of anti-coccidial compounds other than the 3-pyridine sulfonamides described above. The 3-pyridine sulfonamide compound is present in such poultry feeds in a minor but anticoccidially effective amount, and preferably is within the above-mentioned concentrations. Such feed concentrations are frequently referred to as the "use levels."

The compositions which are one of the preferred features of the invention are feed supplements or pre-mixes in which the active anticoccidial ingredient is present in relatively large amounts in a poultry feed additive. The carrier vehicle or diluent for such feed supplements should be essentially non-reactive with the anticoccidial ingredient, and safely administrable to poultry, and one that is or may be a normal ingredient of the finished feed. Diluents which are normally employed are solid orally ingestible poultry feed additives such as distillers' dried grains, corn meal, citrus meal, fermentation residues, wheat middlings, corn gluten feed, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. For the compositions of this invention, nutritive carriers are preferred. These supplements are incorporated in the poultry feed either directly or after an intermediate dilution or blending step.

The 3-pyridine sulfonamide compounds of Formula I above are intimately dispersed or blended throughout the solid orally-ingestible carrier by methods such as grinding, stirring, milling or tumbling. The active anticoccidial compound is normally dispersed or mixed uniformly in the diluent but in some instances may be sorbed on the carrier. The desired concentration of coccidiostat is achieved by selecting proper diluents and by altering the ratio of carrier to active ingredient. Animal feed supplement formulations containing from about 10% to about 40% by weight, and preferably from about 15–30% by weight, of 3-pyridine sulfonamide compound are particularly suitable for addition to poultry feeds, and are a preferred part of our invention. The optimal concentration of coccidiostat in these feed supplements will depend to some extent on the particular compound employed. Since it is convenient for the feed manufacturer to use about 1–5 pounds of feed supplement for each ton of finished feed, the preferred concentration of any one of these coccidiostats in the supplement is also to a large extent a function of the desired level of active ingredient in the finished feed.

Examples of typical feed supplements containing a 3-pyridine sulfonamide compound dispersed in a solid inert carrier are:

Lbs.

(A)

| | |
|---|---|
| 3-pyridine sulfonamide | 25.0 |
| Wheat standard middlings | 75.0 |

(B)

| | |
|---|---|
| 4-methyl-3-pyridine sulfonamide | 20.0 |
| Corn distillers' dried grains | 55.0 |
| Corn germ meal | 25.0 |

(C)

| | |
|---|---|
| N-ethyl-3-pyridine sulfonamide | 15.0 |
| Wheat shorts | 85.0 |

(D)

| | |
|---|---|
| N,N-dimethyl-3-pyridine sulfonamide hydrochloride | 30.0 |
| Wheat standard middlings | 70.0 |

(E)

| | |
|---|---|
| N-methyl-3-pyridine sulfonamide | 25.0 |
| Ground oyster shells | 20.0 |
| Molasses solubles | 30.0 |
| Antibiotic mycelia | 25.0 |

These and similar feed supplements are prepared by intimately mixing the anticoccidial compound with the carrier or carriers as described above.

The feed supplements of the type illustrated are usually further diluted with feed ingredients such as corn meal or soybean meal before being incorporated in the animal feed. In this intermediate processing step the level of coccidiostat is reduced, thus facilitating uniform distribution of the substance in the finished feed which is a nutritionally adequate one normally containing a source of fat, protein, carbohydrate, minerals, vitamins and other nutritional factors.

As previously stated, these 3-pyridine sulfonamides are effective primarily against the intestinal forms of coccidiosis. Of such forms, E. brunetti is particularly well controlled by such compounds. These sulfonamides are also active against E. acervulina and E. maxima infections, but in experiments conducted to date E. brunetti is the most susceptible species.

An additional aspect of the invention, therefore, comprises novel and highly effective, broad spectrum anticoccidial compositions obtained by mixing or combining the 3-pyridine sulfonamides of Formula I with one or more other anticoccidial agents that are primarily effective against the E. tenella species of coccidia, i.e. the so-called cecal forms. With such combinations it is possible to achieve excellent control of mixed infections which are not completely responsive to any one coccidiostat alone. Among the coccidiostats heretofore developed for prophylactic use and active primarily against E. tenella and E. necatrix, there may be mentioned 2-methyl-3,5-dinitrobenzamide, nicarbazin, glycarbylamide, 3,5-dinitrobenzamide, methiotriazamine-bithionol mixtures, 1-(2-loweralkyl-4-amino-5-pyrimidinylmethyl)-2 - methyl pyridinium quaternary salts and 1-(2-loweralkyl-4-amino 5-pyrimidinylmethyl)-4-methyl pyridinium quaternary salts such as 1-(2-n-propyl-4-amino-5 - pyrimidinylmethyl) - 2-methyl pyridinium chloride hydrochloride (amprolium), and 1-(2-n-propyl-4-amino-5-pyrimidinylmethyl)-4-methyl pyridinium chloride hydrochloride. All or any of these, as well as others not given in this representative listing may be mixed with the 3-pyridine sulfonamides of Formula I to give highly potent coccidiostat compositions.

In practicing the aspects of our invention wherein a 3-pyridine sulfonamide, as herein described, and a second coccidiostat primarily effective against *E. tenella* are employed, the 3-pyridine sulfonamide compound is administered at the levels previously set forth, i.e., at 0.005%–0.05% by weight of the poultry feedstuff. The other anticoccidial substance is normally present in the concentration range at which it acts against *E. tenella*. Good results in the treatment and control of coccidiosis are obtained when the weight ratio in the finished feed of 3-pyridine sulfonamide compound to the other "*E. tenella*" coccidiostat is from about 1:10 to about 1:0.1.

In addition to the compositions containing a 3-pyridine sulfonamide and a second coccidiostat effective against *E. tenella* species, our invention also embraces mixtures or combinations containing in addition a third type of coccidiostat that is extremely active against *E. maxima* infections, namely a 2-alkoxy-4-amino benzoic acid compound of the type described in Belgian Patent No. 613,166, granted July 26, 1962. These substances include compounds of the formula

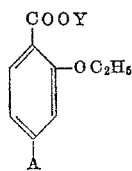

where Y is hydrogen, lower alkyl or an alkali metal, and A represents amino, benzoylamino or lower alkanoyl-amino. Such compounds, added in very minor amounts to the combinations previously described, provide an anticoccidial product that is extremely effective in combatting the mixed infections encountered in the poultry raising industry since it contains one coccidiostat acting primarily against *E. tenella* and *E. necatrix,* a second one acting primarily against *E. maxima* and to some extent against other intestinal species, and as a third component the 3-pyridine sulfonamides described herein acting primarily against *E. brunetti* and to a lesser extent against other intestinal species.

In the compositions of this invention the weight ratio of the 3-pyridine sulfonamide compound to the 2-ethoxy benzoic acid compound is in the range of 1:0.2 to 1:0.003. Only very minor amounts of the benzoic acid type compound are required in such compositions because they are quite effective at use levels as low as 0.0002–0.001% by weight of poultry feed.

The preparation of poultry feed supplements and of the medicated feeds themselves containing a 3-pyridine sulfonamide and other coccidiostats is carried out in the same manner as described above for producing a feed or feed supplement containing the sulfonamide as the only anticoccidial agent.

Typical examples of feed supplements coming within this aspect of our invention are:

Composition— Lbs.

(A)

| | |
|---|---|
| 3-pyridine sulfonamide | 25.0 |
| Amprolium | 25.0 |
| Methyl-2-ethoxy-4-acetamido benzoate | 1.0 |
| Corn gluten feed | 99.0 |

(B)

| | |
|---|---|
| 4-methyl-3-pyridine sulfonamide | 20.0 |
| 2-methyl-3,5-dinitro benzamide | 30.0 |
| Wheat middlings | 50.0 |

(C)

| | |
|---|---|
| N-methyl-3-pyridine sulfonamide | 15.0 |
| 3,5-dinitro benzamide | 25.0 |
| 2-ethoxy-4-amino benzoic acid | 2.0 |
| Corn distillers' dried grains | 50.0 |
| Corn gluten feed | 8.0 |

(D)

| | |
|---|---|
| 3-pyridine sulfonamide | 30.0 |
| Amprolium | 25.0 |
| Wheat middlings | 45.0 |

(E)

| | |
|---|---|
| N-N-diethyl-3-pyridine sulfonamide | 15.0 |
| Nicarbazin | 30.0 |
| Ground oyster shell | 15.0 |
| Dried fermentation residue | 40.0 |

The following examples are given for the purpose of illustration and not by way of limitation.

EXAMPLE 1

*4-methyl-3-pyridine sulfonamide*

A finely powdered mixture of 3.4 g. of 4-methyl-3-pyridine sulfonic acid and 4.1 g. of phosphorus pentachloride is slowly heated in an oil bath to 80° C. A viscous liquid results which is added to liquid ammonia. Evaporation of the ammonia yields a solid which is extracted with hot ethyl acetate. The ethyl acetate extract is then separated and evaporated to yield crude 4-methyl-3-pyridine sulfonamide. This product is crystallized from a small amount of water to give substantially pure 4-methyl-3-pyridine sulfonamide hemihydrate, M.P. 135° C.

EXAMPLE 2

*N-methyl-3-pyridine sulfonamide*

A mixture of 145 gms. of 3-pyridine sulfonic acid and 209 gms. of phosphorus pentachloride is stirred and heated. When the mixture begins to liquify, external heating is reduced until gas evolution subsides. The mixture is then heated for three hours at the reflux temperature of phosphorus oxychloride, or until hydrogen chloride evolution ceases. The phosphorus oxychloride is then removed by concentration in vacuo, toluene added to the residue and then removed by concentration in vacuo. The resulting residue is diluted to a volume of 500 ml. with benzene and the resulting solution clarified by filtration through diatomaceous earth. The resulting clear solution of 3-pyridine sulfonyl chloride in benzene is used for the experiments described in the following paragraph and in Examples 3–6.

50 ml. of the benzene solution of 3-pyridine sulfonyl chloride (obtained as above) is diluted with 50 ml. of benzene, and anhydrous methylamine passed into the resulting solution with ice cooling. The temperature rises to 30° C. and then begins to fall. When it reaches 10° C., addition of methylamine is stopped and the resulting mixture heated on a steam bath for 15 minutes. It is then filtered and the filtrate allowed to cool to room temperature. The resulting crystals are dissolved in 75 ml. of warm ethyl acetate, and ether added to the cloud point. The solution is filtered through diatomaceous earth and petroleum ether added to the filtrate until crystallization of N-methyl-3-pyridine sulfonamide begins. The solid product is collected by filtration and recrystallized from water to give 5.1 gms. of substantially pure material, M.P. 114–116° C.

EXAMPLE 3

*N-ethyl-3-pyridine sulfonamide*

30 ml. of the benzene solution of 3-pyridine sulfonyl chloride (obtained as in Example 2) is added to 40 ml. of aqueous ethylamine, with stirring. The resulting mixture is allowed to cool and concentrated to a small volume in vacuo. 100 ml. of benzene is added to the residue, and the benzene removed by concentration in vacuo. This process is repeated until all the water is removed from the residue. The product is then dissolved in benzene, the resulting solution dried over magnesium sulfate, filtered and concentrated to a small volume. Petroleum ether is added until crystallization begins. The resulting crystals of N-ethyl-3-pyridine sulfonamide are recovered by filtration and recrystallized from benzene-petroleum ether to give substantially pure material, M.P. 75–77° C.

EXAMPLE 4

A. N,N-dimethyl-3-pyridine sulfonamide 40 ml. of the benzene solution of 3-pyridine sulfonyl chloride (obtained as in Example 2) is diluted with an additional 100 ml. of benzene, and dimethylamine passed into the resulting solution, with stirring, for about 15 minutes. The resulting warm mixture is filtered and the filtrate heated on a steam bath for one hour. It is then concentrated essentially to dryness and the residue extracted with benzene. The benzene extract is dried and concentrated in vacuo to a small volume. Petroleum ether is added to induce crystallization of N,N-dimethyl-3-pyridine sulfonamide. The resulting crystals are collected by filtration and recrystallized from benzene-petroleum ether to give substantially pure material, M.P. 96–98° C.

B. N,N-diethyl-3-pyridine sulfonamide

To a stirred solution of 10 ml. of diethylamine in 75 ml. of water there is added simultaneously, with ice cooling, dilute sodium hydroxide and 35 ml. of benzene solution of 3-pyridine sulfonyl chloride (prepared as in Example 2). The resulting mixture is then stirred at room temperature, 20–50 ml. of ether added and the organic solvent layer separated. The organic solvent solution thus obtained is washed with water, dried and evaporated to dryness in vacuo. The residue is crystallized from petroleum ether and the resulting N,N-dimethyl-3-pyridine sulfonamide recrystallized from ether-petroleum ether to give pure material, M.P. 51–52° C.

EXAMPLE 5

A. 4-methyl-N-methyl-3-pyridine sulfonamide 4-methyl-3-pyridine sulfonyl chloride is prepared by treating 4-methyl-3-pyridine sulfonic acid with phosphorus pentachloride as described in Example 1, and the resulting viscous liquid treated with anhydrous methylamine according to the procedure of Example 2. Employing the isolation procedure of Example 2, there is obtained 4-methyl-N-methyl-3-pyridine sulfonamide.

B. 4-methyl-N,N-dimethyl-3-pyridine sulfonamide 4-methyl-N,N-dimethyl-3-pyridine sulfonamide is obtained by treating 4-methyl-3-pyridine sulfonyl chloride with dimethylamine as described according to the procedure of Example 4A.

EXAMPLE 6

N-propyl-3-pyridine sulfonamide 40 ml. of a benzene solution of 3-pyridine sulfonyl chloride (prepared as in Example 2) is added with cooling to a solution of 25 ml. of propylamine in 25 ml. of pyridine. The resulting mixture is heated on a steam bath for 30 minutes and then evaporated in vacuo to a heavy residue. This residue is extracted with 200 ml. of ether and the ether solution washed with water, and then dried. To the ether solution there is added an excess of ethanolic hydrogen chloride. N-propyl-3-pyridine sulfonamide hydrochloride crystallizes from this solution. It is recovered by filtration and purified by recrystallization from ethanol-ether to give pure material, M.P. 152–153° C.

EXAMPLE 7

Anticoccidial activity of the 3-pyridine sulfonamide compounds described herein against E. brunetti species of coccidia is determined in the following manner:

Straight run White Leghorn chicks, in groups of three each, are weighed and placed in cages with wire floors. They are fed ad libitum a standard laboratory ration in which graded concentrations of test compounds are blended just prior to use. Normal and infected control birds are fed basal ration containing no test compound. On the second day of the test the chicks are inoculated orally with 100,000 sporulated oocysts of Eimeria brunetti. On the sixth day after inoculation all surviving birds are sacrificed and weighed. Feces collected from the preceding 24 hours are brought to a volume of 100 ml. with tap water and homogenized in a blender for three minutes. Five ml. of the homogenate are added to 5 ml of N NaOH for oocyst counting. Two aliquots of the suspension are placed in separate counting chambers of a hemocytometer. Five separate 0.1 (mm.$^3$) volumes in each chamber are counted. If the total count of oocysts is less than 30, the compound is rated as active.

When treated by the above procedure, the compounds listed below are active at the dose levels shown.

General formula:

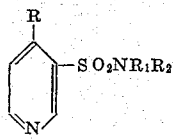

| Compound | R | $R_1$ | $R_2$ | Dose Level (Percent by Wt. in Feed) |
|---|---|---|---|---|
| 3-pyridine sulfonamide | H | H | H | 0.025 |
| N-methyl-3-pyridine sulfonamide | H | $CH_3$ | H | 0.025 |
| N-ethyl-3-pyridine sulfonamide | H | $C_2H_5$ | H | 0.025 |
| N,N-dimethyl-3-pyridine sulfonamide | H | $CH_3$ | $CH_3$ | 0.025 |
| N,N-diethyl-3-pyridine sulfonamide | H | $C_2H_5$ | $C_2H_5$ | 0.025 |
| N-propyl-3-pyridine sulfonamide | H | $n\text{-}C_3H_7$ | H | 0.0125 |
| 4-methyl-3-pyridine sulfonamide | $CH_3$ | H | H | 0.025 |

EXAMPLE 8

The coccidiostatic activity of 3-pyridine sulfonamide against mixed coccidial infections is determined by the following method:

Straight-run White Rock chicks in groups of ten each are weighed and placed in cages. They are fed a standard laboratory ration in which graded concentrations of coccidiostat are blended just prior to use. Normal and infected control birds are fed the basal ration containing no coccidiostat. On the second day of the test, all the chicks except the normal controls are orally inoculated with 50,000 sporulated oocysts each of E. tenella, E. necatrix, E. acervulina, E. maxima and E. brunetti. On the eighth day, the surviving birds are sacrificed and weighed. The standards used for evaluating the anticoccidial activity of the compounds tested are mortality rate, the growth of the chicks, the severity of pathological lesions produced by the coccidia, and the number of oocysts recovered from fecal collections. Lesions are scored as follows: 0=normal; 1=detectable; 2=moderate and 4=maximal coccidiosis lesions.

Oocysts are counted by the following procedure: Five ml. of fecal suspension are added to 5 ml. of N NaOH. Four separate aliquots are placed in separate counting chambers of a hemocytometer, and the oocysts in 0.5 ml. of each aliquot were counted. The number of oocysts is multiplied by the appropriate dilution factor and divided by the number of chicks sacrificed in the group to obtain the number of oocysts per chick.

In an experiment carried out in this way in which 3-pyridine sulfonamide was fed together with 1-(2-n-propyl-4-amino-5-pyrimidinylmethyl)-2-methylpyridinium chloride hydrochloride (generic name, amprolium) and with methyl 2-ethoxy-4-acetylamino benzoate (generic name, ethopabate), the results set forth in Table I were obtained.

TABLE I

| Compound | Percent Compound in Feed | Percent Mortality | Percent Wt. Gain | Lesion Score | | Millions of Oocysts in Surviving Animals |
| --- | --- | --- | --- | --- | --- | --- |
| | | | | Cecum | Intestine | |
| Infected Control | | 100 | | 4.0 | 4.0 | |
| Normal Control | | 0 | 90 | | | |
| 3-pyridine sulfonamide+amprolium | 0.025+0.006 | 0 | 53 | 0.4 | 1.5 | 2.6 |
| | 0.025+0.0125 | 0 | 69 | 0.0 | 0.0 | 0.6 |
| Amprolium | 0.006 | 0 | 31 | 3.0 | 2.2 | 7.8 |
| | 0.0125 | 0 | 30 | 2.0 | 1.8 | 7.9 |

EXAMPLE 9

When 3-pyridine sulfonamide alone and in combination with other coccidiostats was tested by the procedure set forth in Example 8 against an *E. acervulina*, *E. maxima* and *E. brunetti* mixed infection (200,000 sporulated oocysts), the results set forth in Table II were obtained.

TABLE II

| Compound | Diet Concentration | No. chicks | Percent Mortality | Percent Wt. Gain | Score Lesions | Millions of Oocysts in Surviving Animals |
| --- | --- | --- | --- | --- | --- | --- |
| (a) Amprolium+ethopabate+ 3-nitro-4-hydroxyphenyl arsonic acid+3-pyridine sulfonamide | 0.0125 0.0004 0.005 0.0125 | 10 | 0 | 104 | 0.5 | 4.7 |
| (b) Amprolium+ethopabate+ 3-nitro-4-hydroxyphenyl arsonic acid. | 0.0125 0.0004 0.005 | 10 | 0 | 76 | 0.7 | 50.7 |
| (c) 3-pyridine sulfonamide | 0.006 | 10 | 0 | 80 | 0.3 | 11.3 |
| | 0.0125 | 10 | 0 | 76 | 0.3 | 4.4 |
| | 0.025 | 10 | 0 | 88 | 0.5 | <0.1 |
| (d) Infected control | | 30 | 3 | 66 | 0.8 | 70.5 |
| (e) Normal control | | 20 | 0 | 103 | | |

Any departure from the above description which conforms to the present invention is intended to be included within the scope of the claims.

We claim:

1. An anticoccidial composition comprising an animal feedstuff having dispersed therein a 3-pyridine sulfonamide of the formula

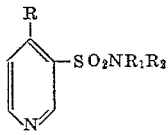

where R is selected from the class consisting of hydrogen and methyl, and $R_1$ and $R_2$ are each selected from the class consisting of hydrogen and lower alkyl.

2. An anticoccidial composition comprising a poultry feed having dispersed therein from about 0.005% to about 0.1% by weight of a 3-pyridine sulfonamide of the formula

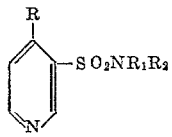

where R is selected from the class consisting of hydrogen and methyl, and $R_1$ and $R_2$ are each selected from the class consisting of hydrogen and lower alkyl.

3. An anticoccidial composition comprising a poultry feed having dispersed therein as an active anticoccidial agent a minor amount of 3-pyridine sulfonamide.

4. An anticoccidial composition comprising a poultry feed having dispersed therein from about 0.005% to about 0.05% by weight of 3-pyridine sulfonamide.

5. The method of controlling intestinal coccidiosis in poultry that comprises orally administering to poultry a minor amount of a compound having the formula

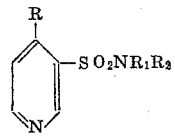

where R is selected from the class consisting of hydrogen and methyl, and $R_1$ and $R_2$ are each selected from the class consisting of hydrogen and lower alkyl.

6. The method of controlling intestinal coccidiosis in poultry that comprises orally administering to poultry a minor amount of 3-pyridine sulfonamide.

7. An anticoccidial composition that comprises a solid nutritive poultry feed additive having dispersed therein from about 10–50% by weight of a compound of the formula

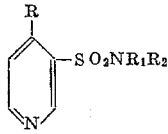

where R is selected from the class consisting of hydrogen and methyl, and $R_1$ and $R_2$ are each selected from the class consisting of hydrogen and lower alkyl.

8. An anticoccidial composition that comprises a solid nutritive poultry feed additive having dispersed therein from about 10–50% by weight of 3-pyridine sulfonamide.

9. An anticoccidial composition comprising a mixture of a sulfonamide compound of the formula

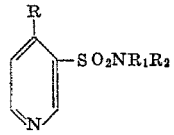

where R is selected from the class consisting of hydrogen and methyl, and $R_1$ and $R_2$ are each selected from the class consisting of hydrogen and lower alkyl and a coccidiostat having high activity against the *E. tenella* species of coccidia, the weight ratio of said sulfonamide compound to said other coccidiostat being in the range of 1:10 and 1:0.1.

10. An anticoccidial composition comprising a mixture of a sulfonamide compound of the formula

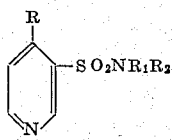

where R is selected from the class consisting of hydrogen and methyl, and $R_1$ and $R_2$ are each selected from the class consisting of hydrogen and lower alkyl and a coccidiostat having high activity against the *E. tenella* species of coccidia, and a 2-ethoxy benzoic acid compound of the formula

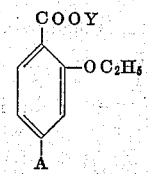

where Y is selected from the class consisting of hydrogen and lower alkyl, and A is selected from the class consisting of amino, lower alkanoylamino and benzoylamino, the weight ratio of said sulfonamide compound to said other coccidiostat active against *E. tenella* being in the range of 1:10 and 1:0.1, and the weight ratio of said sulfonamide compound to said 2-ethoxy benzoic acid compound being in the range of 1:0.2 to 1:0.003.

11. An anticoccidial composition comprising a mixture of 3-pyridine sulfonamide and amprolium.

12. An anticoccidial composition comprising a mixture of 3-pyridine sulfonamide, amprolium and methyl-2-ethoxy-4-acetamido benzoate.

13. A poultry feed having dispersed therein from about 0.005% to about 0.1% by weight of a 3-pyridine sulfonamide of the formula

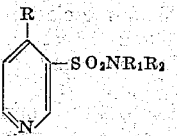

where R is selected from the class consisting of hydrogen and methyl, and $R_1$ and $R_2$ are each selected from the class consisting of hydrogen and lower alkyl and a minor amount of a second anticoccidial compound having high activity against the *E. tenella* species of coccidia.

14. A poultry feed containing about 0.01–0.03% by weight of a compound having the formula

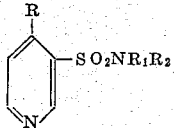

where R is selected from the class consisting of hydrogen and methyl, and $R_1$ and $R_2$ are each selected from the class consisting of hydrogen and lower alkyl and about 0.01–0.03% by weight of a coccidiostat having high activity against the *E. tenella* species of coccidia, and about 0.0002–0.0008% by weight of a compound having the formula

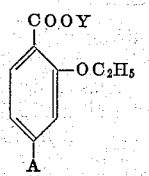

where Y is selected from the class consisting of hydrogen and lower alkyl, and A is selected from the class consisting of amino, lower alkanoylamino and benzoylamino.

15. A poultry feed containing about 0.01–0.03% by weight of 3-pyridine sulfonamide, about 0.01–0.03% by weight of amprolium and about 0.0002–0.0008% by weight of methyl 2-ethoxy-4-acetamido benzoate.

16. A poultry feed having dispersed therein from about 0.005%–0.05% by weight of 3-pyridine sulfonamide and from about 0.01–0.03% by weight of amprolium.

References Cited by the Examiner

FOREIGN PATENTS 705,944    3/54    Great Britain.

OTHER REFERENCES

Chem. Abst., Fourth Decennial Index, 1949, page 8410.

JULIAN S. LEVITT, *Primary Examiner*.

LEWIS GOTTS, *Examiner*.